United States Patent [19]

Boström et al.

[11] Patent Number: 5,898,072
[45] Date of Patent: Apr. 27, 1999

[54] AQUEOUS SUSPENSION OF A CELLULOSE ETHER, METHOD FOR THE PRODUCTION THEREOF, AND COMPOSITION

[75] Inventors: Peter Boström, Kungälv; Lars Andersson, Stenungsund, both of Sweden

[73] Assignee: Akzo Nobel nv, Arnhem, Netherlands

[21] Appl. No.: 08/737,073

[22] PCT Filed: Apr. 21, 1995

[86] PCT No.: PCT/EP95/01524

§ 371 Date: Oct. 29, 1996

§ 102(e) Date: Oct. 29, 1996

[87] PCT Pub. No.: WO95/30705

PCT Pub. Date: Nov. 16, 1995

[30] Foreign Application Priority Data

May 5, 1994 [SE] Sweden .................................. 9401553

[51] Int. Cl.⁶ .......................... C08B 11/00; C08B 11/02; C08B 11/193; C08B 11/08
[52] U.S. Cl. ................... 536/84; 536/56; 536/90; 536/91; 536/95; 536/96; 536/97; 536/98; 536/99
[58] Field of Search .................. 536/56, 84, 90, 536/91, 97, 95, 98, 96, 99

[56] References Cited

U.S. PATENT DOCUMENTS

| | | | |
|---|---|---|---|
| 3,489,719 | 1/1970 | Savage et al. | 260/73 |
| 5,268,466 | 12/1993 | Burdick | 536/114 |

FOREIGN PATENT DOCUMENTS

| | | |
|---|---|---|
| 0 003 582 | 8/1979 | European Pat. Off. . |
| 0 413 274 | 2/1991 | European Pat. Off. . |
| 0 482 533 | 4/1992 | European Pat. Off. . |
| 0 562 341 | 9/1993 | European Pat. Off. . |
| 1719445 | 11/1964 | Germany . |

OTHER PUBLICATIONS

Abstract, Derwent, JP 48026235.

*Primary Examiner*—James O. Wilson
*Assistant Examiner*—Everett White
*Attorney, Agent, or Firm*—Ralph J. Mancini

[57] ABSTRACT

The invention concerns an aqueous suspension of a non-ionic, water-soluble cellulose ether cross-linked with glyoxal, in the presence of an electrolytic salt which gives a pH value below 8.0 in water and at the concentration involved. Conveniently, the suspension is produced by mixing the water included with a dry blend containing the cellulose ether and the electrolytic salt, and preferably the other components of the suspension as well.

18 Claims, No Drawings

AQUEOUS SUSPENSION OF A CELLULOSE ETHER, METHOD FOR THE PRODUCTION THEREOF, AND COMPOSITION

This invention relates to a suspension of a water-soluble, cross-linked cellulose ether having a fairly low salt content. The suspension is advantageously produced by adding water to a composition in the form of a dry blend that contains the water-soluble, cross-linked cellulose ether and a salt.

Water-soluble, non-ionic cellulose ethers are used in many industrial processes, as well as in many consumer products. Thus, such ethers are used in mining, papermaking, water purification and textile treatment, as well as in paint compositions, cleaning agents and cosmetics. It is, however, difficult to dissolve pulverulent, water-soluble and non-ionic cellulose ethers, owing to their tendency to gel and agglomerate. One way of solving this problem is to suspend the water-soluble cellulose ethers in water containing a considerable amount of electrolyte and, optionally, a dispersing agent and/or a stabiliser. When mixing water in, the electrolyte content is reduced and the cellulose ethers are dissolved without any gelling or lump formation. The cellulose ethers thus suspended in water have proved well suited for use as intermediate product in industrial processes and in the making of consumer products.

European Patent Application 413 274 discloses an aqueous suspension of hydroxyethylcellulose. This suspension contains 8–28% by weight of water-soluble hydroxyethylcellulose; 20–35% by weight of potassium carbonate, based on the weight of potassium carbonate and water; 0.2–8% by weight of a wetting agent having an HLB value of 6–9; and 0.08–0.6% by weight of a water-soluble or water-swellable thickening agent, both contents being based on the total weight of the suspension. Also, European Patent Application 482 533 teaches the suspension of a non-ionic cellulose ether, such as hydrophobe-modified hydroxyethylcellulose, hydrophobe-modified ethyl hydroxyethylcellulose, methylcellulose and hydroxyethylcellulose, in an aqueous solution of sodium formate. It appears from the Examples that a gel, and not a liquid suspension, is obtained when the content of sodium formate is 20% by weight or 25% by weight of the total composition. According to this European patent application, sodium formate has to be present in an amount of at least 30% by weight if a suspension is to be obtained. However, even though stable and useful suspensions can be produced in accordance with these two European patent applications, these suspensions will contain unacceptably high contents of electrolyte.

European Patent Application 3 582 teaches a method for reducing the electrolyte content of suspensions of water-soluble, non-ionic cellulose ethers. According to the patent application, this is achieved by adding not only an electrolytic salt but also an aluminium oxide compound. Owing to the addition of aluminium oxide, the electrolyte content may, according to the patent application, be reduced from about 25% to 10%. The presence of aluminium oxide, either in solid or in colloidal state, may, however, have adverse effects later on when the suspension is to be used.

One object of the present invention is to provide a suspension of a cellulose ether of low salt content without the use of any water-insoluble metal oxides. Another object of the invention is to enable the production of suspensions having a low as well as a high content of cellulose ether. Yet another object of the invention is to enable simple and expedient production of the suspension at the place where it is to be used, thereby to avoid unnecessary transports of water.

According to the present invention, it has now been found that these objects are attained by an aqueous suspension of a water-soluble, non-ionic cellulose ether, which is cross-linked with glyoxal and has a turbidity point of 25–100° C., preferably 30–80° C., as measured in a 1% aqueous solution, and an electrolytic salt giving a pH value below 8.0, preferably below 7.5, in water and at the concentration used in the suspension. Conveniently, the cellulose ether is present in an amount of 6–36%, based on the weight of the suspension, while the electrolytic salt is present in an amount of 4–12%, preferably 5–8%, based on the weight of the suspension. Apart from the cellulose ether and the electrolytic salt, the suspension suitably contains a stabiliser consisting of a viscosity-increasing polymer that is soluble in the electrolytic solution and is present in an amount of 0.01–3%, based on the weight of the suspension. Conveniently, the suspension further contains a dispersing agent, such as a surfactant, in an amount of 0.5–4% by weight. Usually, the dispersing agent has a stabilising and viscosity-reducing effect.

When producing the inventive suspension, all the dry substances, except the non-ionic cellulose ether, can be mixed, whereupon water and any liquid or paste-like additives may be added. The cellulose ether is then added to the resulting aqueous fluid.

In a preferred method for producing the cellulose ether suspension, the water included is mixed with a dry blend containing the cellulose ether, the electrolytic salt, and preferably the other components of the suspension as well. In the event that one or more of the components are in liquid state, this component or these components are conveniently applied to a carrier and then incorporated in the dry blend. If so desired, one or more of the components, excepting the cellulose ether and the electrolytic salt, may also be added to the water after and/or before the admixture to the water of the dry blend containing the cellulose ether and the electrolytic salt. Thorough testing has shown that this mixing method can only be used if the cellulose ether is cross-linked, since minor amounts of the cellulose ether would otherwise dissolve to form a gel. First-stage dry blending of all the components involved, excepting the water, has some important advantages, enabling the preparation of a suspension of the cellulose ether by adding water to a single dry composition.

Conveniently, such a dry composition contains 50–90% by weight of the cellulose ether, preferably 60–85% by weight, and 10–50% by weight of the electrolytic salt, preferably 15–40% by weight. Furthermore, the dry composition may contain 0.02–6% by weight of a stabiliser, and 0.1–8% by weight of a dispersing agent.

As mentioned in the foregoing, the electrolytic salt consists of a salt or a salt mixture that gives a pH value below 8.0, preferably below 7.5, at the contemplated electrolyte content of the aqueous suspension. The reason for this is that the cross-linked cellulose ether is partly hydrolysed at high pH values to form a gel. Examples of suitable salts are NaCl, $Na_2SO_4$, $K_2SO_4$, $NaNO_3$ and $MgSO_4$. Especially preferred salts are alkaline salts with bivalent anions, such $Na_2SO_4$ and $K_2SO_4$. By choosing an electrolytic salt that at least partly, preferably by at least 50% by weight, consists of salts with bivalent anions, it has proved possible to maintain the salt content of the suspension at a level below 8% by weight.

In addition, the amount of salt required depends on the degree of cross-linkage of the cellulose ether, the turbidity point of the cellulose ether, and the temperature of the suspension. Thus, the need of salt decreases as the temperature increases, the degree of cross-linkage increases, and the turbidity point falls.

The non-ionic cellulose ethers employed are conventional cellulose ethers that are cross-linked with glyoxal. Examples of suitable, cross-linkable cellulose ethers are water-soluble alkylcellulose ethers, such as methylcellulose and ethylcellulose; hydroxyalkyl cellulose ethers, such as hydroxypropyl cellulose, hydroxypropyl hydroxybutyl cellulose, hydroxyethyl hydroxypropyl cellulose, hydroxyethyl hydroxybutyl cellulose and hydroxyethyl hydroxypropyl hydroxybutyl cellulose; alkylhydroxyalkyl cellulose ethers, such as methylhydroxyethyl cellulose, methylhydroxypropyl cellulose, ethylhydroxyethyl cellulose, ethylhydroxypropyl cellulose, methylethylhydroxyethyl cellulose and methylethylhydroxypropyl cellulose; and water-soluble cellulose ethers modified with hydrophobic groups in accordance with U.S. Pat. No. 4,228,277 and U.S. Pat No. 5,140,099.

The non-ionic cellulose ethers are cross-linked with glyoxal in a manner known per se. A cross-linked cellulose ether has a suitable degree of cross-linkage when a 1% water slurry thereof at 20° C. and a pH value of 7.0 results, after 5 min of agitation, in a viscosity increase of less than 5%, preferably less than 1%, of the viscosity obtained when the cross-linked cellulose ether is entirely dissolved. Cellulose ethers having a suitable degree of cross-linkage are obtained by reacting 0.05–2 parts by weight of glyoxal with 100 parts by weight of dry cellulose ether.

In order to improve the stability of the suspension, it has been found convenient to add polymeric stabilisers that are soluble in an electrolytic solution, such as xanthan gum and CMC.

Examples of suitable dispersing agents are ionic, low-molecular-weight polymers having a molecular weight of 1,000–15,000, such as low-molecular-weight polyacrylic acids; nonionic surfactants, such as ethylene oxide adducts of alcohols having 10–18 carbon atoms, alkylphenols having a total of 14–18 carbon atoms, and block polymers of ethylene oxide and propylene oxide; anionic surfactants, such as linear alkyl benzenesulphonate, lauryl ether sulphate and phosphate esters of fatty alcohol ethoxylate; cationic surfactants, such as tertiary or quaternary mono- or di-$C_{8-18}$ alkylamines; and amphoteric surfactants, such as betaines.

Apart from the components indicated above, the composition may contain biocides, foam inhibitors, corrosion inhibitors, and so forth.

The invention will now be further illustrated with the aid of a few Examples.

EXAMPLE 1

Dry compositions containing non-ionic cellulose ethers were produced by mixing the following components.

| Components | Composition No., parts by weight | | | | | |
|---|---|---|---|---|---|---|
| | 1 | 2 | 3 | 4 | A | B |
| EHEC[1] | 67.6 | | | 72.5 | | |
| HEC[2] | | | | | 60.0 | |
| MHPC[3] | | 67 | | | | |
| MHEC[4] | | | 67 | | | |
| EHEC[5] | | | | | | 67.6 |
| $Na_2SO_4$ | 29.7 | 30 | 30 | 25.2 | | 29.7 |
| $NaH_2PO_4$ | 0.2 | 0.2 | 0.2 | 0.2 | 1.0 | 0.2 |
| Sodium formate | | | | | 37.9 | |
| Xanthan gum | 0.6 | 0.6 | 0.6 | 0.4 | 0.3 | 0.4 |
| $C_{9-11}$-alcohol + 5.5 EO | 1.2 | | | | | 1.2 |
| (on carrier) | 0.8 | | | | | 0.8 |
| Nonylphenol + 8 EO | | 1.0 | 1.0 | | | |
| (on carrier) | | 0.8 | 0.8 | | | |
| $C_{16-18}$-alcohol + 80 EO | | | | 1.6 | | |

[1]Turbidity point 68° C., viscosity increase after 5 min = 0
[2]Turbidity point > 100° C., viscosity increase after 5 min = 0
[3]Turbidity point 56° C., viscosity increase after 5 min = 0
[4]Turbidity point 58° C., viscosity increase after 5 min = 0

Turbidity point 68° C., not cross-linked.

Aqueous formulations according to the Table below were prepared on the basis of these dry compositions. The viscosity and the stability of the aqueous formulations were determined, and the following results were obtained.

| Composition No. | % | Water, % | Cellulose ether, % | Viscosity[1] | Stability[2] |
|---|---|---|---|---|---|
| 1 | 26.6 | 73.4 | 18 | ++ | ++ |
| 1 | 29.6 | 70.4 | 20 | ++ | +++ |
| 1 | 32.6 | 67.4 | 22 | + | +++ |
| 2 | 29.6 | 70.4 | 20 | ++ | +++ |
| 3 | 29.6 | 70.4 | 20 | ++ | +++ |
| 4 | 31.7 | 68.3 | 23 | + | +++ |
| A | 30 | 70 | 18 | 0 | − |
| B | 26.6 | 73.4 | 18 | 0 | − |

[1]Viscosity: ++ = <5000 mPas, + = ≧50000 mPas (no gelling), 0 = gel
[2]Stability: + = separation observed within 6 hours, ++ = stable after 6 hours but not after 10 days, +++ = stable after 10 days.

The aqueous formulations that gelled are not fit for use, whereas the liquid or highly liquid formulations are acceptable. All the suspensions that separated after storage for some time could be returned to the state of a homogeneous suspension after slight agitation.

EXAMPLE 2

The following aqueous formulations were produced by mixing the components involved, except water, and then suspending the dry blend obtained.

| Components | Composition No., % by weight | | | | | | |
|---|---|---|---|---|---|---|---|
| | 5 | 6 | 7 | 8 | 9 | 10 | 11 |
| EHEC[1] | 22 | 26 | 26 | 26 | 25 | 25 | 22 |
| $Na_2SO_3$ | 7.8 | 7.8 | 7.8 | 7.8 | 7.8 | 7.8 | 7.8 |
| Xanthan gum | 0.05 | — | — | 0.15 | 0.05 | 0.05 | 0.05 |
| Polymeric dispersing agent (polyacrylic acid) | — | 0.2 | — | — | — | — | — |
| Octyl iminodipropionate | — | — | 0.2 | 0.2 | — | — | 0.1 |
| $C_{12-14}$-alkyl diol + 20 EO | — | — | — | — | 0.2 | — | — |
| Quaternised coconut fatty amine ethoxylate in 20% propylene glycol | — | — | — | — | — | 0.2 | — |
| Water | bal. | bal. | bal. | bal. | bal. | bal. | bal. |

[1]According to Example 1. The following results were obtained.

| Composition | Appearance | |
|---|---|---|
| | Viscosity | Stability |
| 5 | ++ | +++ |
| 6 | + | ++ |
| 7 | + | ++ |
| 8 | + | ++ |
| 9 | + | +++ |
| 10 | + | +++ |
| 11 | ++ | +++ |

It is evident from these results that all the slurries were acceptable, but that formulations 6, 7 and 8 have limited stability. Suspensions 5 and 11 having a cellulose ether content of 22% by weight both exhibited excellent stability and low viscosity. Formulations 6, 7 and 8, which separated after storage for some time, formed homogeneous suspensions after agitation.

EXAMPLE 3

The aqueous formulations of Example 2 were prepared by dissolving all the components, except the cellulose ether, in water. It was not until then that the cellulose ether was added. The resulting slurries exhibited the same properties as did the corresponding slurries of Example 2.

We claim:

1. An aqueous suspension of a water-soluble, non-ionic cellulose ether, wherein the aqueous phase comprises an electrolytic salt, and wherein the non-ionic cellulose ether, which is cross-linked with glyoxal, amounts to 6–36% by weight of the suspension and has before cross-linkage a turbidity point of 25–100° C. as measured in a 1% aqueous solution, and wherein the electrolytic salt amounts to 3–12% by weight of the suspension and consists of a salt or a mixture of salts which, in water and at the concentration involved, gives a pH value below 8.0.

2. The aqueous suspension claim 1 wherein the cross-linked cellulose ether, in a 1% water slurry having a temperature of 20° C. and a pH value of 7.0, results in a viscosity increase less than 5% of the viscosity obtained when the cellulose ether is totally dissolved.

3. The suspension of claim 2 wherein the viscosity increase is less than 1% of the viscosity obtained when the cellulose ether is totally dissolved.

4. The aqueous suspension of claim 1 which comprises 5–8%, based on the weight of the suspension, of the electrolytic salt.

5. The aqueous suspension of claim 1 wherein at least 50% by weight of the electrolytic salt consists of a salt with bivalent anions.

6. The aqueous suspension of claim 1 which additionally comprises as a stabilizer, 0.01–3% by weight, based on the weight of the suspension, of a viscosity-increasing polymer that is soluble in the electrolytic solution.

7. The aqueous suspension of claim 6 wherein the stabilizer is xanthan gum.

8. The aqueous suspension of claim 1 which comprises 0.05–4% by weight of a dispersing agent.

9. The aqueous suspension of claim 8 wherein the dispersing agent is a non-ionic, anionic or cationic surfactant.

10. The aqueous suspension of claim 8 wherein the dispersing agent is an ionic, low-molecular-weight polymer having a molecular weight of 1,000–15,000.

11. A method of producing the suspension of claim 1 which comprises mixing the water included with a dry blend containing the cellulose ether and the electrolytic salt.

12. The suspension of claim 1 wherein the pH of the suspension is below 7.5.

13. A dry blend which comprises a cellulose ether cross-linked with glyoxal and an electrolytic salt as claimed in 1 the content of cellulose ether being 50–90% by weight, and the content of electrolytic salt being 10–50% by weight.

14. The dry blend of claim 13 which additionally comprises as a stabilizer, 0.02–6% by weight of a viscosity-increasing polymer that is soluble in the electrolytic solution.

15. The dry blend of claim 14 which comprises 0.1–8% by weight of a dispersing agent.

16. The dry blend of claim 15 wherein the dispersing agent is a nonionic, anionic or cationic surfactant.

17. The dry blend of claim 16 wherein the dispersing agent is an ionic, low-molecular weight polymer having a molecular weight of 1,000–15,000.

18. The dry blend of claim 14 wherein the stabilizer is xanthan gum.

* * * * *